United States Patent [19]

Messori

[11] Patent Number: 4,773,701
[45] Date of Patent: Sep. 27, 1988

[54] STRUCTURAL ELEMENT ASSEMBLY FOR CONSTRUCTING A MOTOR BUS

[75] Inventor: Pier P. Messori, Pino Torinese, Italy

[73] Assignee: Iveco Fiat S.p.A., Torino Via Puglia, Italy

[21] Appl. No.: 21,479

[22] Filed: Mar. 4, 1987

[30] Foreign Application Priority Data

Mar. 21, 1986 [IT] Italy .................. 67225 A/86

[51] Int. Cl.4 ............................................. B62D 29/04
[52] U.S. Cl. .................................. 296/178; 403/187; 403/232.1; 296/29
[58] Field of Search ............... 296/178, 187, 203, 205, 296/29, 30; 403/187, 189, 199, 232.1; 52/283, 758 R

[56] References Cited

U.S. PATENT DOCUMENTS

| 4,074,947 | 2/1978 | Matake et al. | 403/189 |
| 4,111,578 | 9/1978 | Sato et al. | 403/189 |
| 4,283,086 | 8/1981 | Morin | 296/178 |
| 4,358,914 | 11/1982 | Geyer | 296/178 |

Primary Examiner—Robert R. Song
Attorney, Agent, or Firm—Kane, Dalsimer, Sullivan, Kurucz, Levy, Eisele and Richard

[57] ABSTRACT

The assembly comprises a frame, a pair of body sides, a front panel, a rear panel and a roof, and is characterized in that said parts are connected together by threaded connection means.

4 Claims, 3 Drawing Sheets

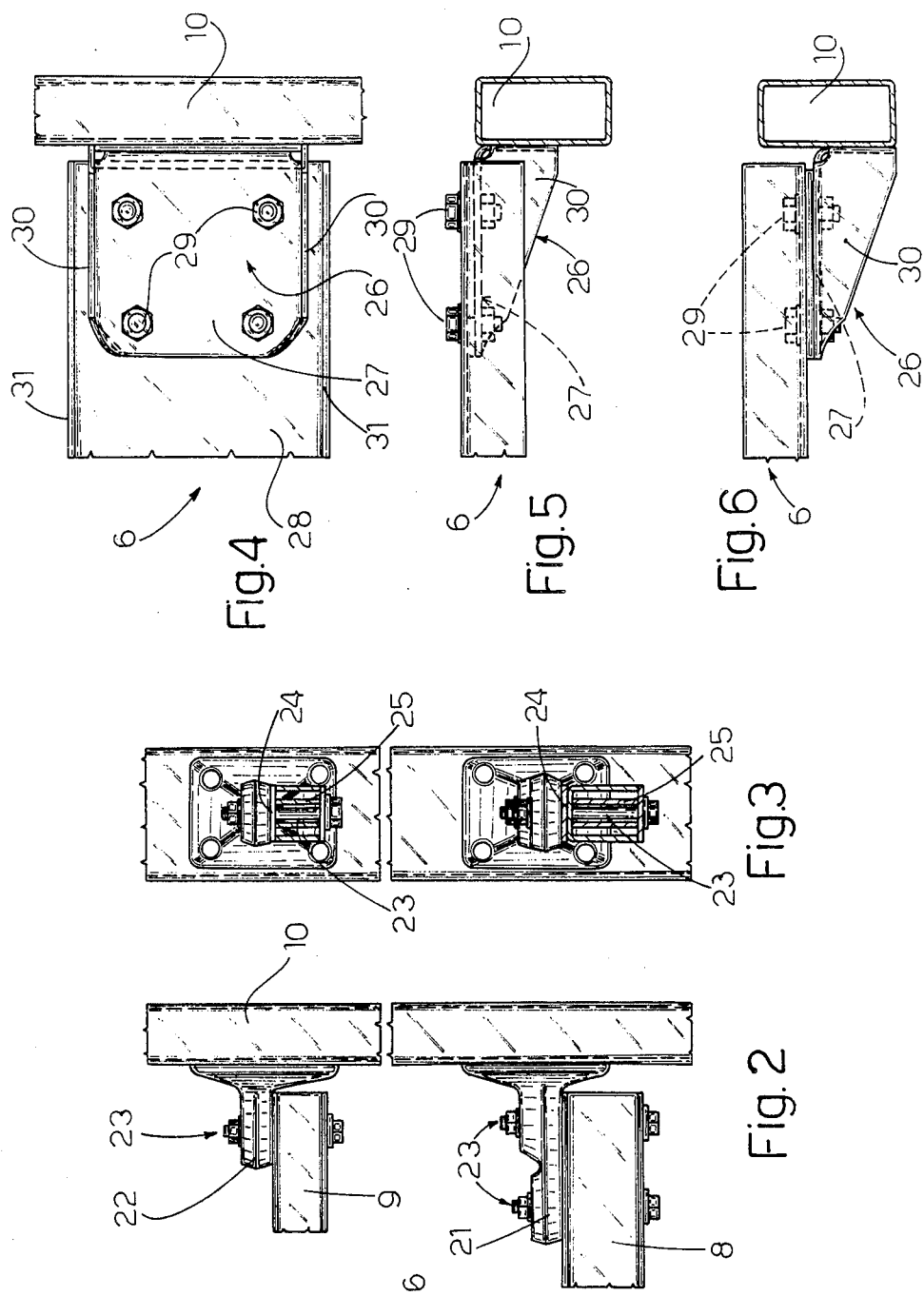

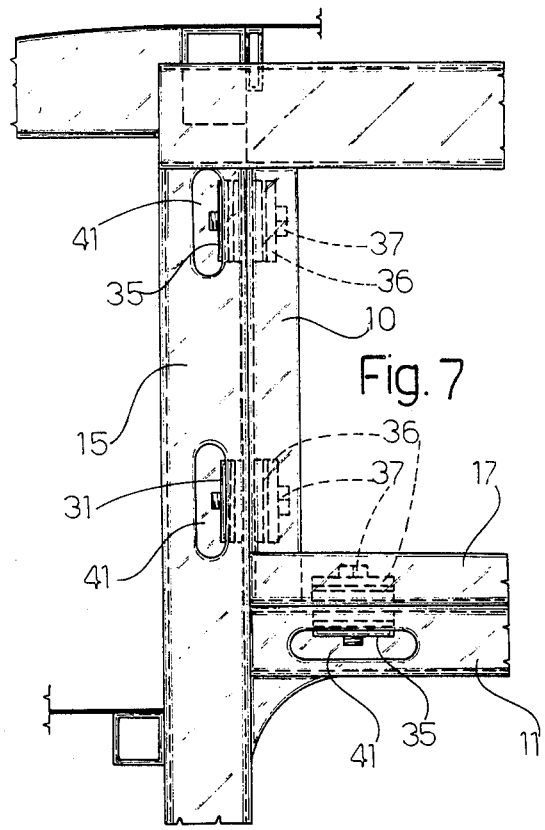
Fig. 7
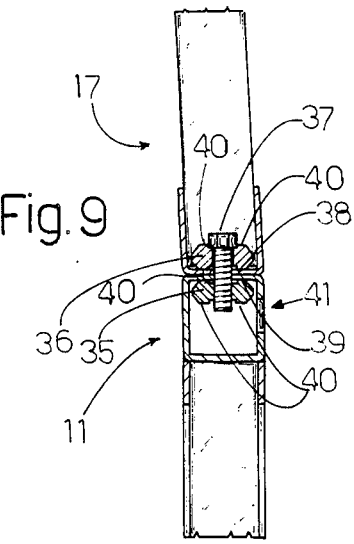
Fig. 9
Fig. 8
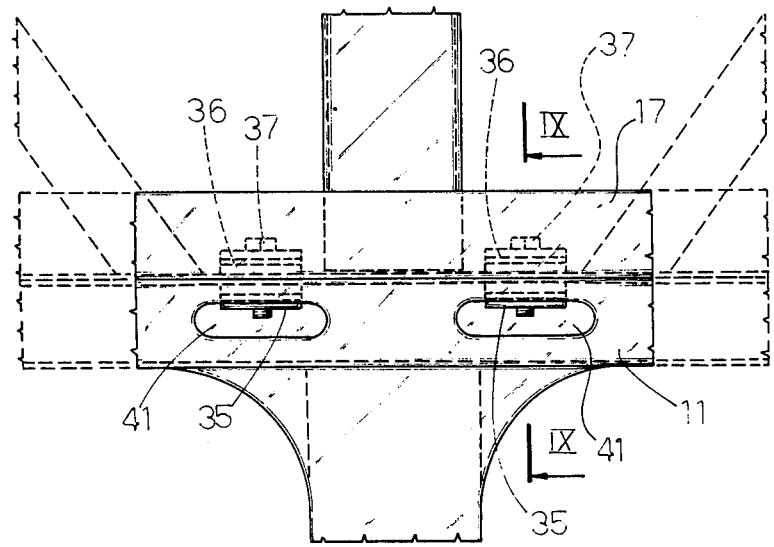

STRUCTURAL ELEMENT ASSEMBLY FOR CONSTRUCTING A MOTOR BUS

BACKGROUND OF THE INVENTION

This invention relates to a load-bearing motor bus structure comprising a frame, a pair of body sides, a front panel, a rear panel and a roof.

In structures of this type, these elements are normally joined together by welding, and by the use of gusset plates of various types interposed between the parts to be joined together. Structures obtained in this manner have certain drawbacks.

Firstly, in addition to the actual welding, supplementary operations are required in order to prepare the parts to be joined together and to protect them from the action of external agents once joined. In this respect, the protection paint layer has to be removed from the surface of those parts to be joined together in order to give access to the metal surface on which the weld seams are to be applied, each connection node then having to be again painted when welding has been completed. In addition, corrosion can easily arise at each of these nodes because the protection obtained by the supplementary painting can be incomplete because of the difficulty of applying the protective paint over the entire surface of the node which is exposed to the action of external agents.

Again, in correspondence with each node, deformation of the joined parts can arise or alteration can occur in the material crystalline structure, with the result that mechanical strength is considerably reduced. The operations required to form such structures are carried out under rather uncomfortable conditions because of the presence of noise and gas, which also influences the quality of the joints obtained.

Furthermore, only parts constructed of the same weldable material can be joined together in the described manner, thus limiting the choice of the economically and operationally most correct design. The parts to be joined together cannot be fitted with installed units before undergoing joining, because of the damage which these units can undergo on account of the fairly high temperature required to make the joints, on account of the gas present, and on account of the foreign substances which come into contact with the inner surfaces of the structural parts. The joints made in the described manner do not allow the parts to be moved relative to each other for any final adjustment of the relative positions of the parts themselves, nor do they allow actual disassembly to be carried out. Because of the considerable dimensions of the structure, serious problems also arise in handling the welding heads. Finally, the production versatility in terms of modifying already prewelded structures is poor, and it is necessary to keep numerous different structural part configurations in store in order to quickly satisfy the constructional requirements of a motor bus of predetermined configuration.

SUMMARY OF THE INVENTION

The object of the present invention is to provide a load-bearing motor bus structure by which the aforesaid drawbacks are obviated.

This object is attained by a load-bearing motor bus structure comprising a frame, a pair of body sides, a front panel, a rear panel and a roof, said frame being provided with first cross-members each of which is in the form of a channel section, and with second cross-members each of which is in the form of a pair of sections disposed in the same vertical plane, said body sides being provided with a plurality of vertical uprights and at least with an upper horizontal longitudinal member, each of said front and rear panels being provided with vertical uprights and at least with an upper horizontal cross-member, said roof being provided at its perimetral edges with longitudinal members and cross-members, characterised in that the cross-members of said frame are connected to said body sides by first and second threaded connection means, said uprights of said front and rear panels are connected to the uprights of said body sides, and said longitudinal members and said cross-members of said roof are connected respectively to said longitudinal members of said body sides and to said cross-members of said panels by third threaded connection means.

BRIEF DESCRIPTION OF THE DRAWINGS

The present invention will be more apparent from the description of one embodiment thereof given hereinafter by way of example with reference to the accompanying drawings, in which:

FIGS. 2 and 3 are partly sectional side views of the first threaded connection means;

FIGS. 4 and 5 are side views of the second connection means;

FIG. 6 is a side view of a modification of the second threaded connection means;

FIGS. 7 and 8 are partial side views of parts of the structure connected together by the third threaded connection means;

FIG. 9 is a section through part of the structure of FIG. 8 on the line IX—IX.

DETAILED DESCRIPTION OF THE INVENTION

Figure 1:
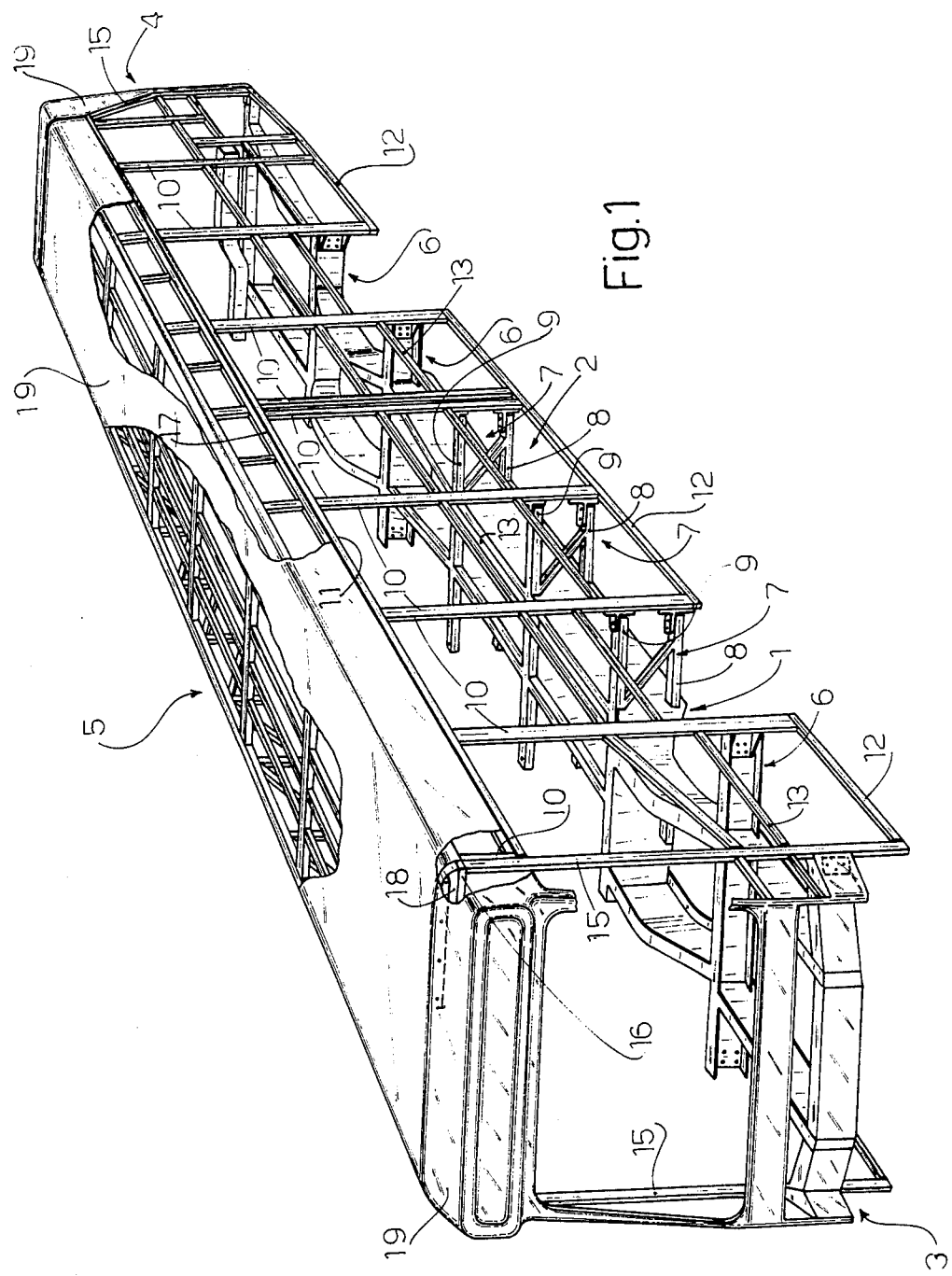
FIG. 1 is a diagrammatic perspective view of the load-bearing structure of the invention.

With reference to FIG. 1, the structure according to the invention comprises substantially a frame 1, a pair of body sides 2, a front panel 3, a rear panel 4 and a roof 5.

The frame 1 is provided with cross-members of a first type 6, each of which consists substantially of a channel section, and cross-members of a second type 7, each of which consists of a pair of sections 8 and 9 disposed in the same vertical plane. Each body side 2 is provided with a plurality of vertical uprights 10, and at least with an upper horizontal longitudinal member 11. Said body side can also comprise other elements such as lower longitudinal members 12 and intermediate longitudinal members 13.

The front panel 3 also comprises at least one pair of vertical uprights 15 and at least one upper horizontal cross-member 16. The rear panel 4 comprises conveniently the same elements, indicated by the same reference numerals, but some of which are not visible in FIG. 1.

The roof 5, which can be provided with any stiffening structure, comprises in correspondence with its perimetral edges at least one pair of longitudinal members 17 and one pair of cross-members 18, the former disposed in a horizontal plane different from that in which the latter are disposed.

Each of the aforesaid structural elements also comprises a suitable sheet metal cladding 19, only part of which is shown in FIG. 1.

The load-bearing structure of the invention is formed with the aforesaid structural elements and with the aid of connection means of various types described hereinafter.

First and second connection means are used for connecting each end of the cross-members 6 and 7 of the frame 1 to the vertical uprights 10 of the body sides 2. The said first connection means comprise substantially a plurality of pairs of brackets 21 and 22 (FIGS. 2 and 3), each of which is welded to the same upright 10 of a body side 2 and is arranged to rest on the end of a corresponding section 8 and 9 of one of the cross-members 7. These connection means are shown clearly in FIGS. 2 and 3, and can conveniently be of the type described in the industrial invention patent application of the present applicant entitled: "Structure for connecting the frame cross-members to a body side of a heavy motor vehicle", filed on Feb. 11, 1986 under No. 67100 A/86.

Said means also comprise a plurality of bolts 23, each of which passes through at least one hole (not shown) in a bracket of a corresponding section, in order to fix the former to the latter. Conveniently, each section 8 and 9 of a cross-member 7 is of substantially rectangular cross-section as clearly shown in FIG. 3, and each of said brackets rests on the upper flat wall 24 of said section. Moreover, conveniently in order to provide each cross-member with greater rigidity, these latter are provided with a pair of vertical plates 25, one on each side of each bolt 23. Conveniently, the lower brackets 21 of each pair are longer than those of the other pair, and are fixed to the end of the corresponding section by a pair of bolts, instead of one only.

The second said connection means comprise a plurality of second brackets 26 (FIGS. 4 and 5), each of which is welded to an upright 10 of the body side 2, and comprises at least one vertical wall 27 to be disposed in contact with the substantially flat, vertical base wall 28 of a cross-member 6. Said means also comprise a plurality of bolts 29, each of which is arranged to pass through holes in the two walls 27 and 28, in order to fix a bracket 26 to a corresponding cross-member 6.

As can be clearly seen in FIGS. 5 and 6, each bracket 26 comprises conveniently a further pair of parallel flat walls 30 substantially orthogonal to the walls 27. Furthermore, the height of each of the brackets 26, measured in the vertical direction, is substantially less than the height of the compartment defined between the two side walls 31 and the cross-member 6, so as to enable said bracket to be inserted into said compartment. In the case shown in FIG. 6, the bracket is not disposed inside this compartment.

The structure also comprises third threaded connection means to connect the uprights 15 of the front and rear panels 3, 4 to the corresponding uprights 10 of the body sides 2, and to connect the cross-members 16 of said panels to the cross-members 18 of the roof 5. Connection means of the same type are also used to connect the upper longitudinal members 11 of each body side 2 to the corresponding longitudinal members 17 of the roof 5. Each of said third connection means comprises substantially a pair of plates 35 and 36 (FIG. 9), the first of which is provided with a threaded bore into which a screw 37 is screwed, and the second of which is provided with a hole through which the shank of said screw passes, and thus forms a support for the head of the screw itself. Two substantially flat walls 38 and 39 pertaining to the longitudinal members 17 and 11 of the roof 5 and body side 2 respectively are disposed between the first and second plate. As can be clearly seen in FIG. 9, each of said longitudinal members is conveniently of channel or of completely closed rectangular cross-section. It is apparent that said cross-sections can be different from those shown, and either of them can be used at choice to form one or other longitudinal member. Each of the main opposing faces of each plate 35 and 36 is provided with a pair of substantially parallel ribs 40 arranged to rest on the surface of said walls 38 and 39. The aforesaid third connection means can be conveniently of the type described in the industrial invention patent application of the present applicant entitled: "Structure composed of at least two structural elements fixed together by connection means", filed on Feb. 11, 1986 under No. 67099 A/86.

Conveniently, as can be clearly seen in FIGS. 7, 8 and 9, if sections of closed rectangular cross-section are used, they are conveniently provided with perforations 41, each of which is formed in correspondence with one of the third connection means to enable the lower plate 35 of said means which has the screw 37 screwed into its threaded bore to be inserted through said perforation.

The load-bearing structure of the invention is formed in the following manner.

The various structural elements for forming said structure, namely the frame 1, the body sides 2, the front and rear panels 3 and 4 and the roof 5, can be produced by conventional methods and then be stored. In particular, some of them can already by provided with installed units or internal members required by the finished vehicle.

When a vehicle of a predetermined configuration is to be constructed, the frame 1 is disposed on suitable equipment (not shown) which allows the frame to undergo small vertical and longitudinal movements with respect to the plane in which it rests. The two body sides 2 are then positioned relative to the frame, by disposing them in a vertical position such that the brackets 21 and 22 of the first connection means are substantially above the corresponding sections 8 and 9, but without these brackets resting on the corresponding upper walls 24. When each body side has been positioned in this manner, the brackets 26 of the second connection means are located within the compartment defined between the side walls 31 of each cross-member 6, but without the vertical wall 27 of each of these brackets being in contact with the corresponding base wall 28 of the relative cross-member.

The frame 1 is then raised slightly so as to bring the sections 8 and 9 into contact with the corresponding brackets 21 and 22, so that these rest on the walls 24 of said sections. At this point, bolts 23 can be inserted through the holes in the brackets and sections, but without completely tightening the bolts. The frame 1 is then moved frontwards in its longitudinal direction. In this manner, the vertical walls 27 of the brackets 26 are brought into contact with the base walls 28 of the cross-members 6. The bolts 29 can then be inserted through the relative holes in said walls. In this configuration, the position of each body side relative to the frame is correctly established, and the bolts 23 and 29 of the first and second construction means can thus be completely tightened.

The front panel 3 and rear panel 4 can then be mounted, using the third connection means. For this purpose, as clearly shown in FIG. 7, the uprights 15 of the panel 3 can be brought into contact with the upright 10 of the body side 2, and the connection means of the third type can be used to fix these parts together. The rear panel 4 is treated in a like manner. The roof 5 is connected to the other parts of the structure by simply resting the longitudinal members 17 and cross-members 18 on the longitudinal members 11 of the body sides 2 and on the cross-members 16 of the panels 3 and 4 respectively, and then fixing the former to the latter by using the third said connection means. Two connection nodes which determine this fixing are shown in FIGS. 7 and 8.

It is therefore apparent that with the structure according to the invention, the connections when made can be easily broken in order both to correct any assembly errors and to more accurately set the relative position of the parts or to separate them. Furthermore, because of the ease and rapidity with which the connections can be made, the shapes and arrangements of the body sides can differ from the conventional ones, so as to obtain a more modular vehicle composition and a reduction in the number of parts which need to be kept in store in order to satisfy predetermined production requirements. Again, the construction and handling of the body structural elements can be simplified, and it is no longer necessary to keep entire preassembled structures of different dimensions in store, as the assembly of a new structure is much more simple and rapid than in the case of welding. The structure of the invention also enables high force transmission to be obtained in each connection node, because of the mechanical strength and high rigidity of the connection thus made.

The parts involved in the connection undergo no deformation and no variation in their mechanical characteristics, as occurs in the case of welded joints. The assembly operations can be carried out very simply and rapidly under comfortable conditions. The parts to be joined together can also be constructed of different non-weldable materials, with the advantage of obtaining maximum design economy and functionality. Installed units or various parts involved in the fitting-out of the vehicle body can be mounted on some of the structural elements before these are connected to the frame. In this respect, these units and parts do not hinder the operations involved in making the connections, nor are they damaged during the operations themselves.

It is apparent that modifications can be made to the shape and arrangement of the various parts of the described structure, but without leaving the scope of the invention.

I claim:

1. A load-bearing motor bus structure comprising a frame, a pair of body sides, a front panel, a rear panel and a roof, said frame being provided with first cross-members each of which is in the form of a channel section, and with second cross-members each of which is in the form of a pair of sections disposed in the same vertical plane, said body sides being provided with a plurality of vertical uprights and at least with an upper horizontal longitudinal member, each of said front and rear panels being provided with vertical uprights and at least with an upper horizontal cross-member, said roof being provided at its perimetral edges with longitudinal members and cross-members, characterised in that the cross-members of said frame are connected to said body sides by first and second threaded connection means, said uprights of said front and rear panels are connected to the uprights of said body sides, and said longitudinal members and said cross-members of said roof are connected respectively to said longitudinal members of said body sides and to said cross-members of said panels by third threaded connection means.

2. A load-bearing motor bus structure comprising:
a frame;
a pair of body sides;
a front panel;
a rear panel and;
a roof;
   said frame being provided with first cross-members each of which is in the form of a channel section, and with second cross-members each of which is in the form of a pair of sections disposed in the same vertical plane;
   said body sides being provided with a plurality of vertical uprights and at least with an upper horizontal longitudinal member;
   each of said front and rear panels being provided with vertical uprights and at least with an upper horizontal cross-member;
   said roof being provided at its perimetral edges with longitudinal members and cross-members, characterized in that the cross-members of said frame are connected to said body sides by first and second threaded connection means;
   said uprights of said front and rear panels being connected to the uprights of said body sides, and said longitudinal members and said cross-members of said roof being connected respectively to said longitudinal members of said body sides and to said cross-members of said panels by third threaded connection means;
   said first thread connection means comprising a plurality of pairs of first brackets, the brackets of each pair being welded to the same uprights of a body side and being arranged to rest on a corresponding section of one of said second cross-members, and a plurality of bolts each of which passes through a hole in one of said brackets and in one of said corresponding sections, in order to fix the former to the latter.

3. A load-bearing motor bus structure comprising:
a frame;
a pair of body sides;
a front panel;
a rear panel and;
a roof;
   said frame being provided with first cross-members each of which is in the form of a channel section, and with second cross-members each of which is in the form of a pair of sections disposed in the same vertical plane; said body sides being provided with a plurality of vertical uprights and at least with an upper horizontal longitudinal member;
   each of said front and rear panels being provided with vertical uprights and at least with an upper horizontal cross-member;
   said roof being provided at its perimetral edges with longitudinal members and cross-members, characterized in that the cross-members of said frame are connected to said body sides by first and second threaded connection means;
   said uprights of said front and rear panels being connected to the uprights of said body sides, and said longitudinal members and said cross-members of said roof being connected respectively to said longitudinal members of said body sides and to said cross-members of said panels by third threaded connection means;

said second connection means comprising a plurality of second brackets each of which is welded to an upright of said body side and has a vertical wall to be disposed in contact with the base wall of the channel section of one of said first cross-members, and a plurality of bolts each of which is arranged to pass through holes in said wall in order to fix a bracket to the corresponding first cross-member.

4. A load-bearing motor bus comprising:
a frame;
a pair of body sides;
a front panel;
a rear panel and;
a roof;

said frame being provided with first cross-members each of which is in the form of a channel section, and with second cross-members each of which is in the form of a pair of sections disposed in the same vertical plane;

said body sides being provided with a plurality of vertical uprights and at least with an upper horizontal longitudinal member;

each of said front and rear panels being provided with vertical uprights and at least with an upper horizontal crossmember;

said roof being provided at its perimetral edges with longitudinal members and cross-members, characterized in that the cross-members of said frame are connected to said body sides by first and second threaded connection means;

said uprights of said front and rear panels are connected to the uprights of said body sides, and said longitudinal members and said cross-members of said roof are connected respectively to said longitudinal members of said body sides and to said cross-members of said panels by third threaded connection means;

each of said connection means comprising a screw, and a pair of plates of which a first is provided with a threaded bore into which said screw is screwed and the second is provided with a hole through which the shank of said screw passes and acts as a support for the screw head, between said first and second plate there being disposed two walls of said uprights, cross-members and longitudinal members which are to be connected together, on each of the main opposing faces of said plate there being provided a pair of ribs arranged to rest on the surfaces of said walls.

* * * * *